(No Model.) 7 Sheets—Sheet 1.
W. H. MORGAN.
OVERHEAD TRAVELING CRANE.
No. 590,847. Patented Sept. 28, 1897.
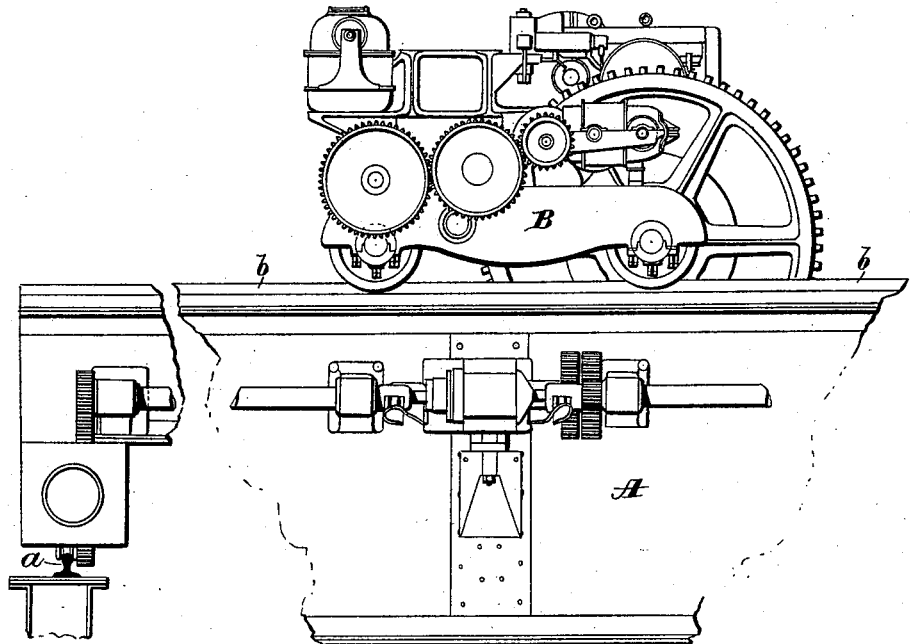
Fig. 1.
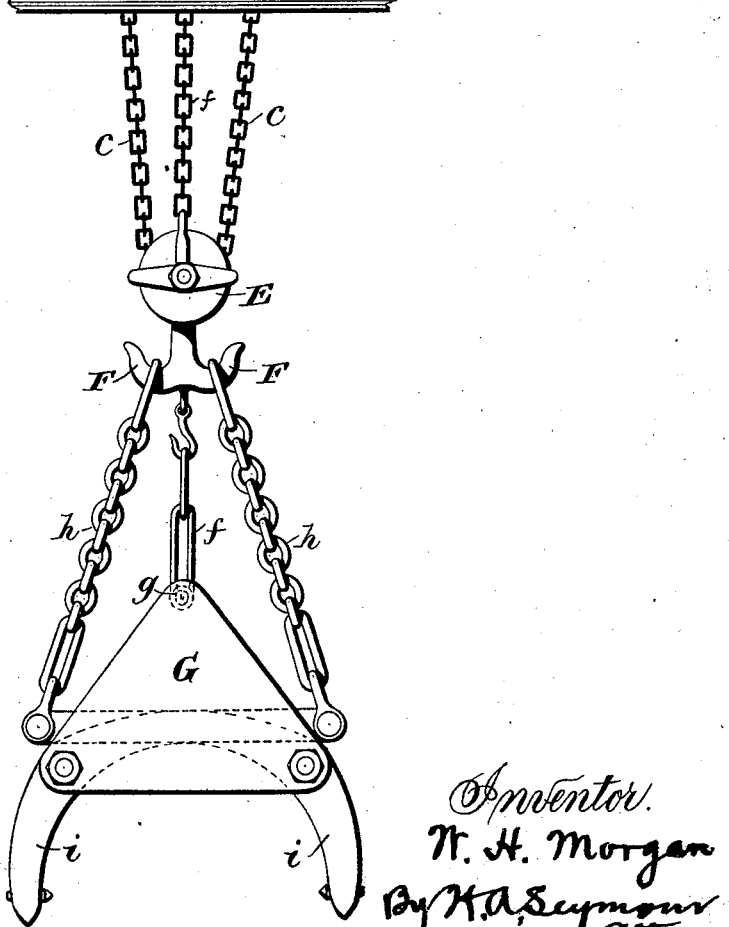
Witnesses:
Jas. E. Hutchinson
G. F. Downing
Inventor.
W. H. Morgan
By H. A. Seymour
Atty.

(No Model.)
7 Sheets—Sheet 2.

W. H. MORGAN.
OVERHEAD TRAVELING CRANE.

No. 590,847. Patented Sept. 28, 1897.

Witnesses:
Jas. E. Hutchinson.
G. F. Downing.

Inventor.
W. H. Morgan
By H. A. Seymour
Atty.

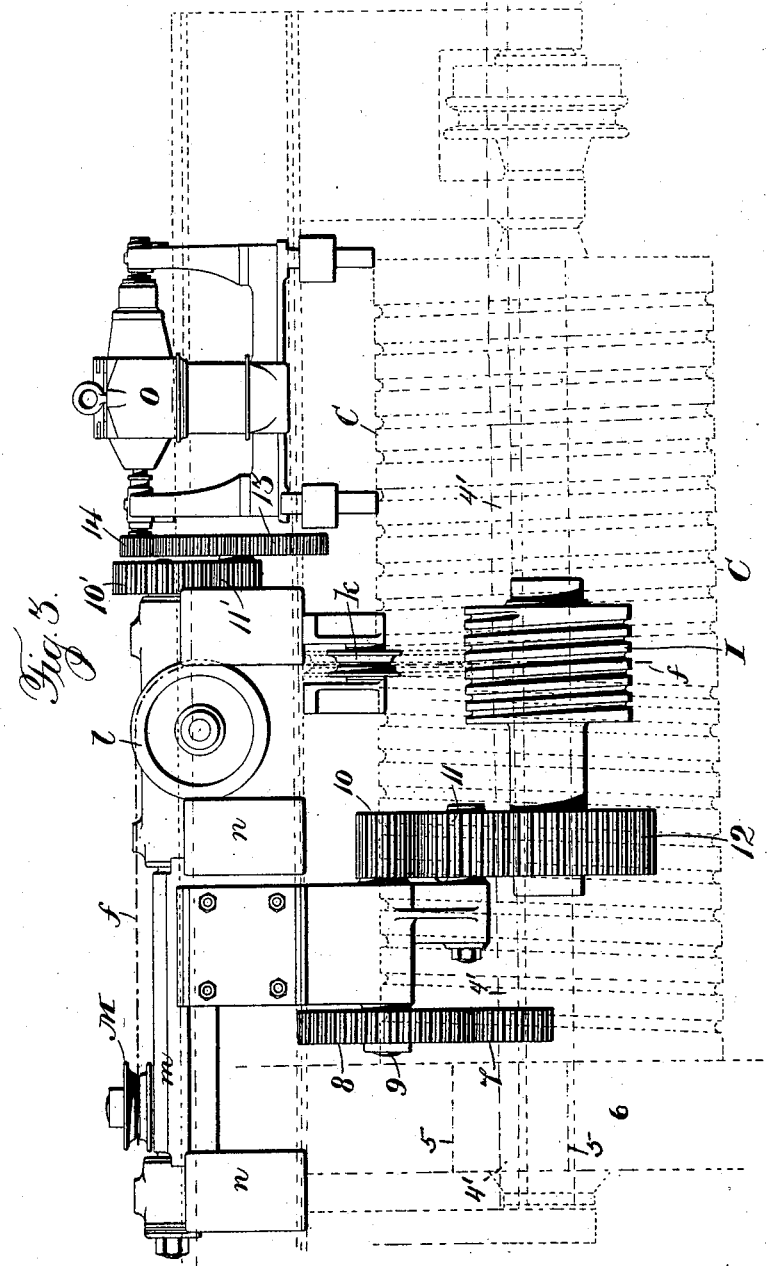

(No Model.) 7 Sheets—Sheet 4.
W. H. MORGAN.
OVERHEAD TRAVELING CRANE.
No. 590,847. Patented Sept. 28, 1897.
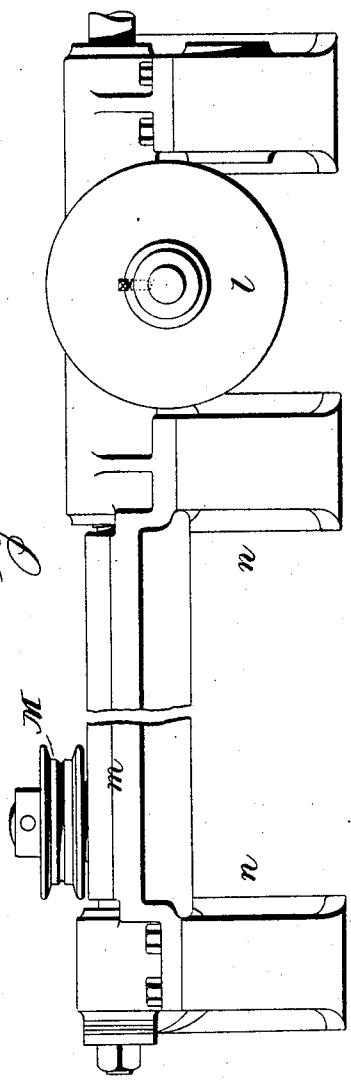
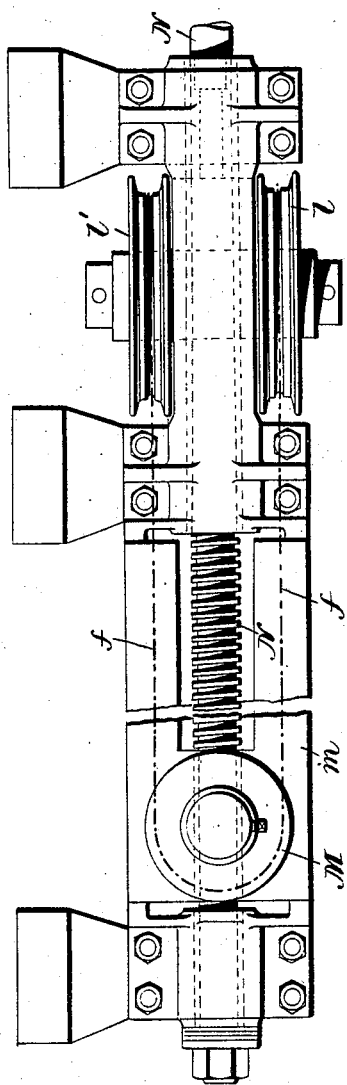

(No Model.)  
7 Sheets—Sheet 5.

W. H. MORGAN.
OVERHEAD TRAVELING CRANE.

No. 590,847. Patented Sept. 28, 1897.

Witnesses  
G. F. Downing.  
S. W. Foster.

Inventor  
W. H. Morgan  
By H. A. Seymour  
Attorney (No Model.) 7 Sheets—Sheet 6.
W. H. MORGAN.
OVERHEAD TRAVELING CRANE.

No. 590,847. Patented Sept. 28, 1897.

(No Model.) 7 Sheets—Sheet 7.
W. H. MORGAN.
OVERHEAD TRAVELING CRANE.

No. 590,847. Patented Sept. 28, 1897.

Witnesses
Jas. E. Hutchinson
G. F. Downing

Inventor
W. H. Morgan
By H. A. Seymour
Attorney

UNITED STATES PATENT OFFICE.

WILLIAM HENRY MORGAN, OF ALLIANCE, OHIO, ASSIGNOR OF THREE-FOURTHS TO THOMAS R. MORGAN, SR., THOMAS R. MORGAN, JR., AND JOHN R. MORGAN, OF SAME PLACE.

OVERHEAD TRAVELING CRANE.

SPECIFICATION forming part of Letters Patent No. 590,847, dated September 28, 1897.

Application filed June 15, 1893. Serial No. 477,674. (No model.)

*To all whom it may concern:*

Be it known that I, WILLIAM HENRY MORGAN, of Alliance, in the county of Stark and State of Ohio, have invented certain new and useful Improvements in Overhead Traveling Cranes; and I do hereby declare the following to be a full, clear, and exact description of the invention, such as will enable others skilled in the art to which it appertains to make and use the same.

My invention relates to an improvement in overhead traveling cranes, and particularly to mechanism employed for releasing and opening grappling-hooks employed for lifting ingots; and it consists in a trolley having a main hoisting-drum and a drum for the releasing-chain and means for shortening the releasing-chain while the drums are in motion or at rest.

My invention further consists in the parts and combination of parts, as will be more fully described, and pointed out in the claims.

Figure 2:
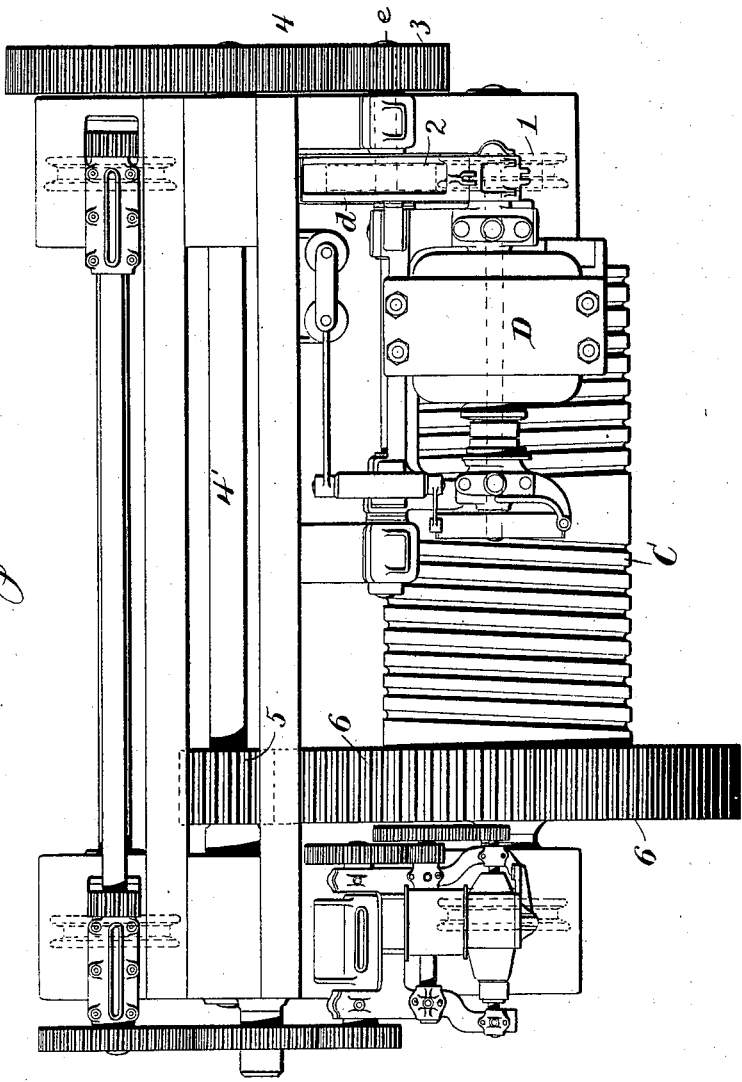
Figure 6:
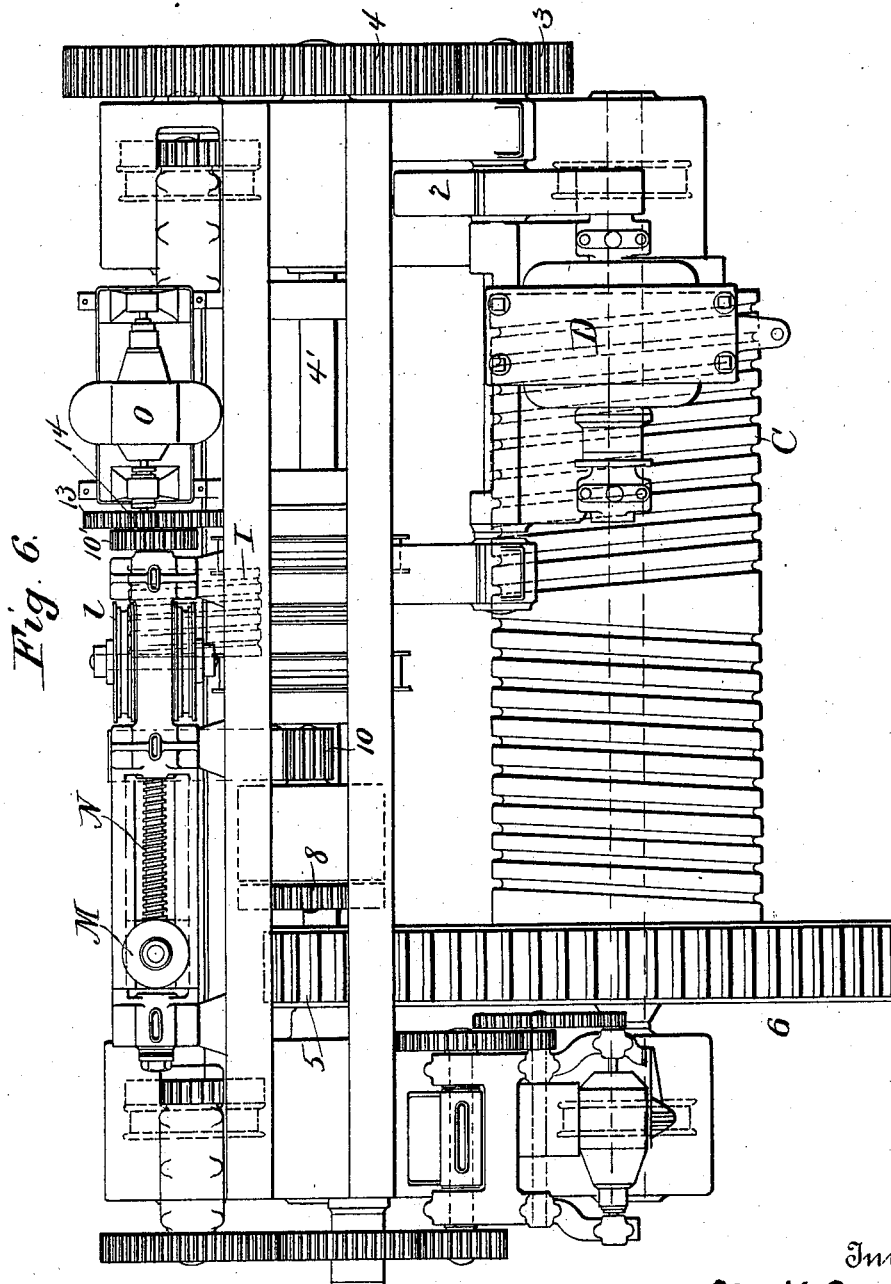
Figure 7:
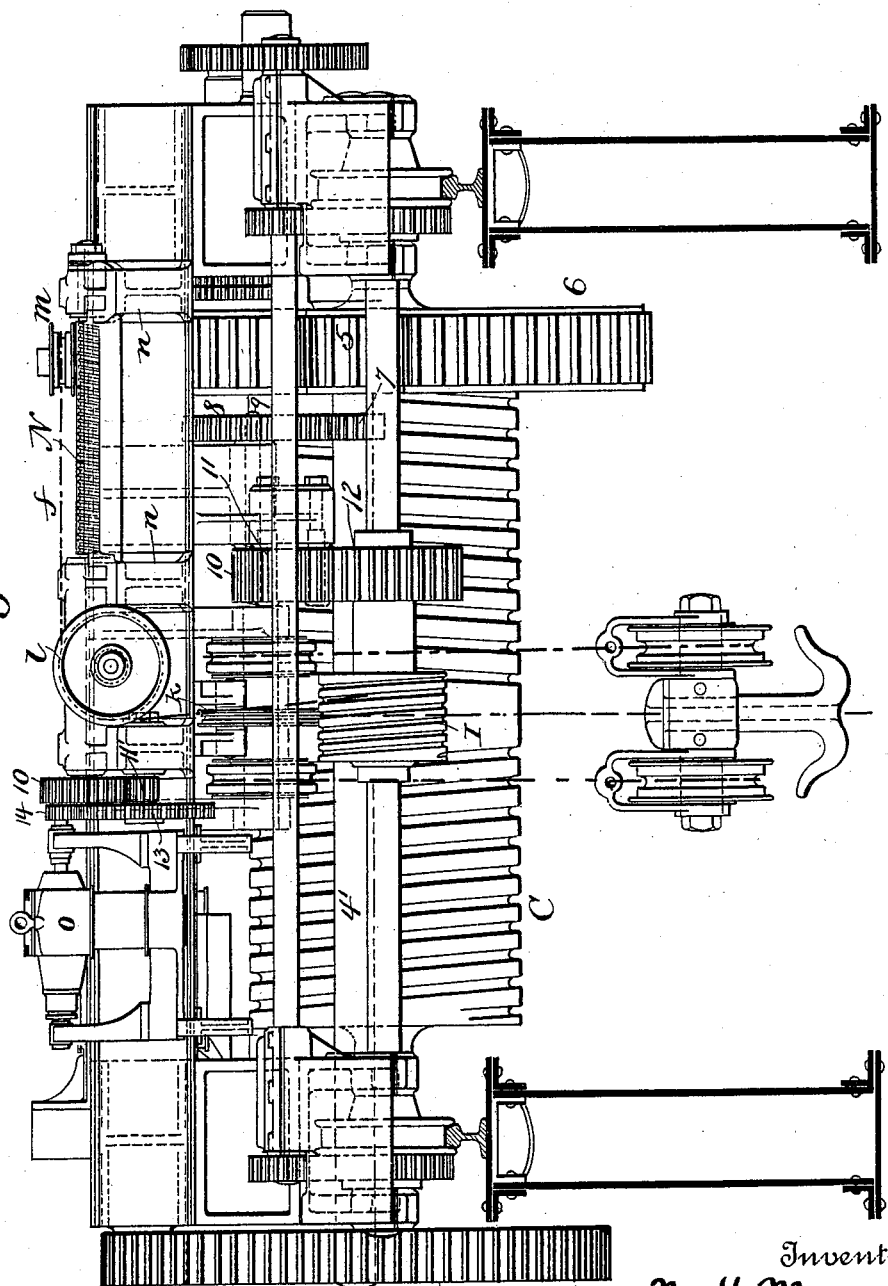
Figure 8:
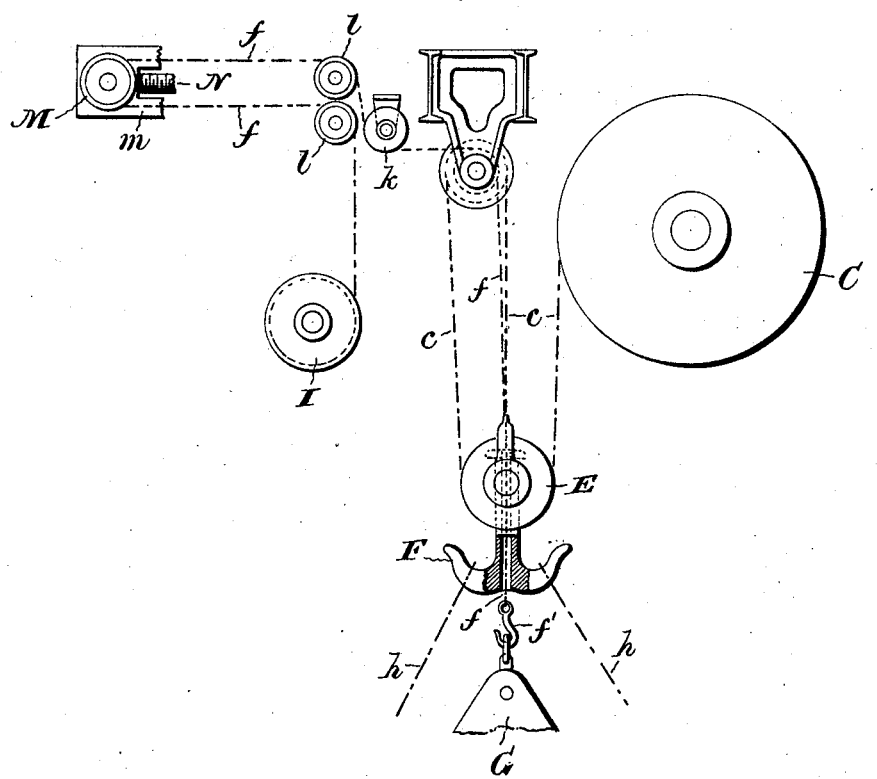

In the accompanying drawings, Figure 1 is a view in side elevation of an overhead traveling crane embodying my invention. Fig. 2 is a plan view of the trolley, showing the main hoisting-drum and operating-gearing, the auxiliary drum for the releasing-chain being removed. Fig. 3 is an end view of the trolley, showing the auxiliary drum and operating-gearing and also the mechanism for shortening the releasing-chain in full lines, the main drum being shown in dotted lines. Fig. 4 is a view in side elevation of the devices for shortening the releasing-chain. Fig. 5 is a plan view thereof. Fig. 6 is a view in plan. Fig. 7 is a view in end elevation of my improved trolley; and Fig. 8 is a diagrammatic view intended to show simply the hoist-chain and take-up chain, no attempt being made to show the several drums and pulleys in their correct positions.

With the tongs used for lifting ingots the constructions are such that the tongs close by gravity, and the weight carried thereby exerts a closing pressure at all times. Even when the weight is at rest the tongs remain in contact therewith, and the slightest upward movement of the tongs immediately causes the teeth thereof to engage the ingot. Hence it is essential to provide positive means for releasing the tongs whether the ingot be at rest or suspended.

While I have shown and described my device in connection with ingot-tongs, the features of improvement are designed to be used for other purposes—such, for instance, as tilting ladles—and hence I would have it understood at the outstart that I do not confine my invention to use on ingot-cranes alone.

A represents an overhead traveling bridge supported at its ends on tracks $a$ and provided on its upper face with trackway $b$, on which the trolley B travels. This trolley B can be driven by any suitable mechanism, preferably, however, by an electric motor and suitable gearing, and is provided with a main hoisting-drum C, to which the ends of the main hoisting-chain $c$ (shown in Fig. 1) are secured. This drum C is driven by the motor D through the intervention of the following gearing: Secured on the armature-shaft of the motor D is a pinion 1, which latter meshes with a second pinion 2, both of which are inclosed in the casing $d$. On the shaft $e$ of this second pinion is secured the pinion 3, which latter meshes with toothed wheel 4, fast on shaft 4'. This shaft 4' carries the pinion 5, meshing with toothed wheel 6, carried by the main drum C. This drum C, as before explained, carries the main hoisting-chain $c$, on which is mounted the hoisting-block E, having twin hooks F.

The shank of the twin or sister hooks F is hollow for the passage of the chain $f$, one end of which is attached at $g$ to the frame G, carrying the tongs, while the opposite end is secured to the auxiliary drum, to be hereinafter referred to.

Carried by the sister hooks F are the chains $h$, each of which is connected to an arm of the bell-crank levers $i$, which form the lifting-tongs. These levers are pivoted at their elbows to the frame G, and hence it will be seen that by slacking chain $f$ the entire weight of the ingot or other object is borne by the tongs $i$ and chains $h$. The auxiliary drum I is actuated by mechanism to be now explained, so as to wind up chain $f$ at same speed as the main hoisting-chain.

Secured to shaft 4' (see Fig. 2) is the pinion 7, (see Fig. 3,) which meshes with toothed wheel 8, fast on shaft 9. This shaft 9 carries the pinion 10, which in turn meshes with idle-pinion 11, and through the intervention of the latter drives pinion 12, fast on the shaft or hub of the auxiliary drum I.

From the foregoing it will be seen that both drums are driven from the same source of power, and by properly proportioning the parts the two drums wind and unwind equal lengths of chain simultaneously. If with the parts thus constructed the chain $f$ be a little slack, the entire weight of the ingot will be borne by chains $h$. If, however, the chain $f$ be shortened, the weight will be shifted from chain $h$ to chain $f$, which being attached to frame G will elevate said frame and allow the upper members of the tongs to fall and the lower ends to open and release the ingot. This shortening of the chain $f$ is accomplished by the following mechanism: One end of the chain $f$ is attached to the drum I and passes upwardly against sheave $k$, over sheave $l$, and around sheave M, and from thence back over sheave $l'$, and down to frame G. The sheave M, around which the chain $f$ passes, is mounted on a stud carried by the cross-head $m$, mounted in ways $n$. This cross-head is provided with a threaded opening for the passage of the screw N, and hence by turning the screw the sheave can be moved back and forth, so as to let out or shorten up chain $f$, as circumstances may require. This screw is provided near one end with a toothed wheel 10', keyed thereto and meshing with pinion 11', fast to toothed wheel 13. Wheel 13 meshes with pinion 14 on armature-shaft of the electric motor O. This motor is under the control of the operator and can be thrown into circuit when the hoisting-motor is at rest or in motion.

In the operation of the device the chain $f$, attached to frame G and actuated by the auxiliary drum I, is slightly longer, or, in other words, is more slack, than the main hoisting-chain, so that the entire weight is borne by the main hoisting-chain. Now to release the ingot either before or after it has been lowered motor O is thrown into circuit and actuates the screw in a direction to move the traveling sheave M away from sheaves $l$, thus drawing up or shortening chain $f$ and transferring the weight from the main hoisting-chain to chain $f$. This transfer of weight from the main chain to chain $f$ also relieves the chain $h$ from the weight of the ingot, and as the horizontal arms of the bell-crank levers or tongs are now free they simply drop and release the ingot.

To attach the tongs to another ingot, they are lowered while in the position last described, and when in a position to engage the ingot chain $f$ is lengthened by moving sheave M toward sheave $l$, thus throwing the weight of frame G and the levers or tongs onto the horizontal members of the latter, which operates to close the grasping-jaws of the latter until they engage the ingot.

It is evident that the devices above described can be used for other purposes and that the constructions can be varied and modified without departing from the spirit of my invention. Hence I would have it understood that I do not confine myself to the uses described nor to the details shown, but consider myself at liberty to employ the parts for other purposes and change the details without departing from the spirit of my invention.

Having fully described my invention, what I claim as new, and desire to secure by Letters Patent, is—

1. The combination with a main hoisting-drum and an auxiliary drum, each carrying a chain, of a sheave around which the auxiliary chain passes, a screw for moving said sheave and a motor for actuating the screw, substantially as set forth.

2. The combination with a main drum, a chain therefor and an auxiliary drum, of sheaves mounted on stationary bearings, a sheave mounted on a movable bearing, a chain carried by the auxiliary drum and passing around said sheaves, and means for moving the sheave on the movable bearing toward and away from the sheaves on the stationary bearings, substantially as set forth.

3. In an overhead traveling crane, the combination with two drums and a chain carried by each, the said drums being geared to move in unison, of tongs consisting essentially of a frame and two bell-crank levers pivoted thereto, one of said chains being connected with the levers and the other with the frame, and means for shortening the chain connected to the frame.

4. The combination with a drum, a chain carried thereby, a chain-block on said chain, and tongs consisting of two levers, and a frame, the levers being pivoted to the frame and connected to the chain-block, of a second drum, a chain carried thereon the latter being connected to the frame of the tongs, and means for shortening said latter chain, substantially as set forth.

5. In combination with a hoisting-cable, an auxiliary cable, and means for winding and unwinding equal lengths of both cables, of a screw-shaft, means for rotating same, and a screw-threaded device mounted on said shaft and adapted to be moved lengthwise the shaft as the latter is rotated, the said device engaging the auxiliary cable for shortening same without interference with the hoisting-cable.

6. In combination with a hoisting-drum, a hoisting-cable carried by the drum and arranged to wind on or off thereof, a screw-shaft, means for rotating said shaft, a female-threaded device carried by the shaft and adapted to be moved lengthwise thereof by the rotation of the shaft and an auxiliary cable arranged to wind and unwind simultaneously with the hoisting-cable, the said auxiliary cable being connected with the screw-threaded device carried by the screw-shaft, substantially as and for the purpose set forth.

7. In combination with a hoisting-drum, a hoisting-cable thereon, a carrying device carried by the hoisting-cable, a trip for the carrying device and a take-up for actuating the trip, the said take-up consisting of a threaded shaft, and a threaded device mounted on said shaft and engaging the trip and adapted to be moved back and forth by rotation of the shaft.

8. The combination with tongs, a hoisting-chain, a hoisting-drum over which said chain passes, an opening-chain, a separate winding-drum over which the opening-chain passes, and means for drawing or slackening the intermediate portion of the opening-chain.

9. The combination of tongs, a hoisting-chain, a hoisting-drum over which said chain passes, an opening-chain, a separate winding-drum over which the opening-chain passes, a sheave over which the intermediate portion of the opening-chain passes, and mechanism arranged to move said sheave so as to draw or slacken the opening-chain.

In testimony whereof I have signed this specification in the presence of two subscribing witnesses.

WILLIAM HENRY MORGAN.

Witnesses:
A. C. STRONG,
T. D. RUSSELL.